US012640506B2

(12) United States Patent
Kobayashi et al.

(10) Patent No.: US 12,640,506 B2
(45) Date of Patent: May 26, 2026

(54) PRESS-FIT TERMINAL

(71) Applicant: SHINEI HI-TEC CO., LTD., Nagano (JP)

(72) Inventors: Ken'ichi Kobayashi, Nagano (JP); Masami Kobayashi, Nagano (JP)

(73) Assignee: SHINEI HI-TEC CO., LTD., Nagano (JP)

( * ) Notice: Subject to any disclaimer, the term of this patent is extended or adjusted under 35 U.S.C. 154(b) by 374 days.

(21) Appl. No.: 18/247,457

(22) PCT Filed: Sep. 29, 2021

(86) PCT No.: PCT/JP2021/035770
§ 371 (c)(1),
(2) Date: Mar. 31, 2023

(87) PCT Pub. No.: WO2022/071364
PCT Pub. Date: Apr. 7, 2022

(65) Prior Publication Data
US 2024/0006788 A1 Jan. 4, 2024

(30) Foreign Application Priority Data
Oct. 2, 2020 (JP) ................................ 2020-167850

(51) Int. Cl.
*H01R 12/58* (2011.01)

(52) U.S. Cl.
CPC ................................ *H01R 12/585* (2013.01)

(58) Field of Classification Search
CPC ................................ H01R 12/585
USPC ................................ 439/816
See application file for complete search history.

(56) References Cited

U.S. PATENT DOCUMENTS 1,417,818 A * 5/1922 Frost ........................ F16B 15/04 24/703.2
3,902,153 A 8/1975 Narozny
4,684,203 A * 8/1987 Bihler .................. H01R 12/585 439/82
5,120,257 A * 6/1992 Hahn ..................... H01R 13/41 439/82
5,635,758 A * 6/1997 Drekmeier ............. H05K 3/308 257/692

(Continued)

FOREIGN PATENT DOCUMENTS

EP 1898496 3/2008
JP H04-342970 11/1992

(Continued)

OTHER PUBLICATIONS

International Preliminary Report on Patentability for International (PCT) Patent Application No. PCT/JP2021/035770, dated Apr. 13, 2023, 6 pages.

(Continued)

*Primary Examiner* — Harshad C Patel
(74) *Attorney, Agent, or Firm* — Sheridan Ross PC

(57) ABSTRACT

The present invention provides a press-fit terminal comprising a main body part having a rod shape; and a pressure contact part extending along the main body part in a cantilever manner from a tip of the main body part while being spaced apart from the main body part, wherein the main body part includes an engagement portion with which a free end portion of the pressure contact part is engageable.

18 Claims, 5 Drawing Sheets

(a) (b) (c)

(56) References Cited

U.S. PATENT DOCUMENTS

| | | | | |
|---|---|---|---|---|
| 7,210,969 | B1 * | 5/2007 | Hashimoto | H05K 3/308 439/82 |
| 9,300,059 | B2 * | 3/2016 | Endo | H01R 12/585 |
| 9,673,574 | B2 * | 6/2017 | Endo | H01R 43/24 |
| 2007/0105456 | A1 | 5/2007 | Hashimoto et al. | |
| 2009/0298312 | A1 * | 12/2009 | Gueckel | H01R 12/7064 439/78 |
| 2011/0195617 | A1 | 8/2011 | Aboulkassem et al. | |
| 2013/0244512 | A1 * | 9/2013 | Endo | H01R 13/052 439/889 |
| 2021/0151912 | A1 * | 5/2021 | Endo | H01R 43/16 |

FOREIGN PATENT DOCUMENTS

| | | |
|---|---|---|
| JP | 2005-259502 | 9/2005 |
| JP | 2007-134474 | 5/2007 |
| JP | 2009-021016 | 1/2009 |
| JP | 2010-522422 | 7/2010 |
| JP | 2011-090797 | 5/2011 |
| JP | 2013-065543 | 4/2013 |

OTHER PUBLICATIONS

International Search Report and Written Opinion for International (PCT) Patent Application No. PCT/JP2021/035770, dated Dec. 14, 2021, 12 pages.

Official Action (with English translation) for Japan Patent Application No. 2020-167850, dated Dec. 7, 2021, 10 pages.

Official Action (with English translation) for Japan Patent Application No. 2020-167850, dated Jun. 28, 2022, 7 pages.

Extended European Search Report for Europe Patent Application No. 21875664, dated Oct. 9, 2024, 7 pages.

* cited by examiner (a) (b)

PRESS-FIT TERMINAL

CROSS REFERENCE TO RELATED APPLICATIONS

This application is a national stage application under 35 U.S.C. 371 and claims the benefit of PCT Application No. PCT/JP2021/035770 having an international filing date of 29 Sep. 2021, which designated the United States, and which PCT application claimed the benefit of Japanese Patent Application No. 2020-167850 filed 2 Oct. 2020, the contents of each of which are incorporated herein by reference in their entireties.

TECHNICAL FIELD

The present disclosure relates to a press-fit terminal.

BACKGROUND ART

A press-fit terminal is a component to be connected to an electronic component, and is connected to a printed circuit board by, for example, being inserted or press-fitted into a terminal accommodation hole provided in the printed circuit board. As such a press-fit terminal, conventionally, an eye-needle type press-fit terminal has been widely used (For example, Patent Document 1). An eye needle type press-fit terminal includes a pressure contact part that is electrically in contact with a contact portion formed on an inner periphery of a terminal accommodation hole, and has a double-supported beam structure that is plastically deformable by providing an opening portion to the pressure contact part.

However, the eye-needle type press-fit terminal has a large pressure contact force from the initial stage of insertion into the terminal accommodation hole, and a large insertion force is required to insert the eye-needle type press-fit terminal into the terminal accommodation hole. In addition, there is a possibility that a large stress acts on the periphery of the terminal accommodation hole to cause damage such as whitening and peeling of plating of an edge portion of the terminal accommodation hole.

In order to avoid the problem of the pressure contact force as described above, for example, a press-fit terminal 300 provided with a separation groove 301*a* at a tip portion of a pressure contact part 301 as shown in FIG. 4 and a press-fit terminal 400 provided with a separation groove 401*a* at a base end portion of a pressure contact part 401 as shown in FIG. 5 are known (Patent Document 2).

PRIOR ART DOCUMENT

Patent Documents

Patent Document 1: JP-A-2005-259502
Patent Document 2: JP-A-2011-090797

SUMMARY OF THE INVENTION

Problems to be Solved by the Invention

Since the press-fit terminal 300 illustrated in FIG. 4 has a structure in which the pressure contact part 301 is crushed from above, the contact angle increases as the insertion and deformation proceed, and the pressure contact force increases and a large stress may act on the periphery of a terminal accommodation hole 101*a* as in a pressure contact force F31 in FIG. 4(*a*) to a pressure contact force F32 in FIG. 4(*b*).

In the press-fit terminal 400 illustrated in FIG. 5, since the shape and strength of the pressure contact part 401 are left-right asymmetric, as illustrated in FIG. 5(*b*), unexpected deformation may occur along with the insertion, and it may be difficult to appropriately insert and connect the press-fit terminal.

As shown in FIG. 6, in the case where a pressure contact part 502 extending in a cantilever manner from the tip of a main body part 501 extending vertically is provided, as shown in FIG. 6(*b*), a distal end side 501*a* of the main body part 501 may be buckled by the insertion force into the press-fit terminal 500.

An object of the present disclosure is to provide a press-fit terminal that can be appropriately connected without damaging a terminal accommodation hole.

Solutions to the Problems

The present disclosure includes the following aspects.

[1] A press-fit terminal comprising: a main body part having a rod shape; and a pressure contact part extending along the main body part in a cantilever manner from a tip of the main body part while being spaced apart from the main body part, wherein the main body part includes an engagement portion with which a free end portion of the pressure contact part is engageable.

[2] The press-fit terminal according to [1], wherein the pressure contact part and the engagement portion are formed such that the pressure contact part is deformed and the free end portion is engaged with the engagement portion so as to be in a double-supported state at a time of insertion into a terminal accommodation hole.

[3] The press-fit terminal according to [1] or [2], wherein two of the pressure contact parts are provided symmetrically with respect to the main body part.

[4] The press-fit terminal according to any one of [1] to [3], wherein the main body part has a relatively narrow tip portion and a relatively wide base end portion.

[5] The press-fit terminal according to any one of [1] to [4], wherein the engagement portion is provided at a boundary between the tip portion and the base end portion.

[6] The press-fit terminal according to any one of [1] to [5], wherein a shape of the engagement portion is a shape corresponding to a shape of the free end portion of the pressure contact part.

[7] The press-fit terminal according to any one of [4] to [6], wherein the engagement portion is a step having the tip portion as a lower stage and the base end portion as an upper stage, and a wall surface of the step has an angle of 45° to 80° with respect to an axis of the main body part.

[8] The press-fit terminal according to any one of [1] to [6], wherein the engagement portion protrudes in a hook shape from a base end side toward a tip side.

Effects of the Invention

In the press-fit terminal of the present disclosure, a pressure contact part extends along a main body part in a cantilevered manner from the tip of the main body part while being spaced apart from the main body part, and the main body part has an engagement portion with which a free end portion of the pressure contact part is engageable, whereby the press-fit terminal can be appropriately connected without damaging a terminal accommodation hole.

EMBODIMENTS OF THE INVENTION

Hereinafter, a press-fit terminal of the present disclosure will be described in detail with reference to the drawings. However, the shape, arrangement, and the like of the press-fit terminal of the present disclosure are not limited to the illustrated example.

Embodiment 1

Figure 1:
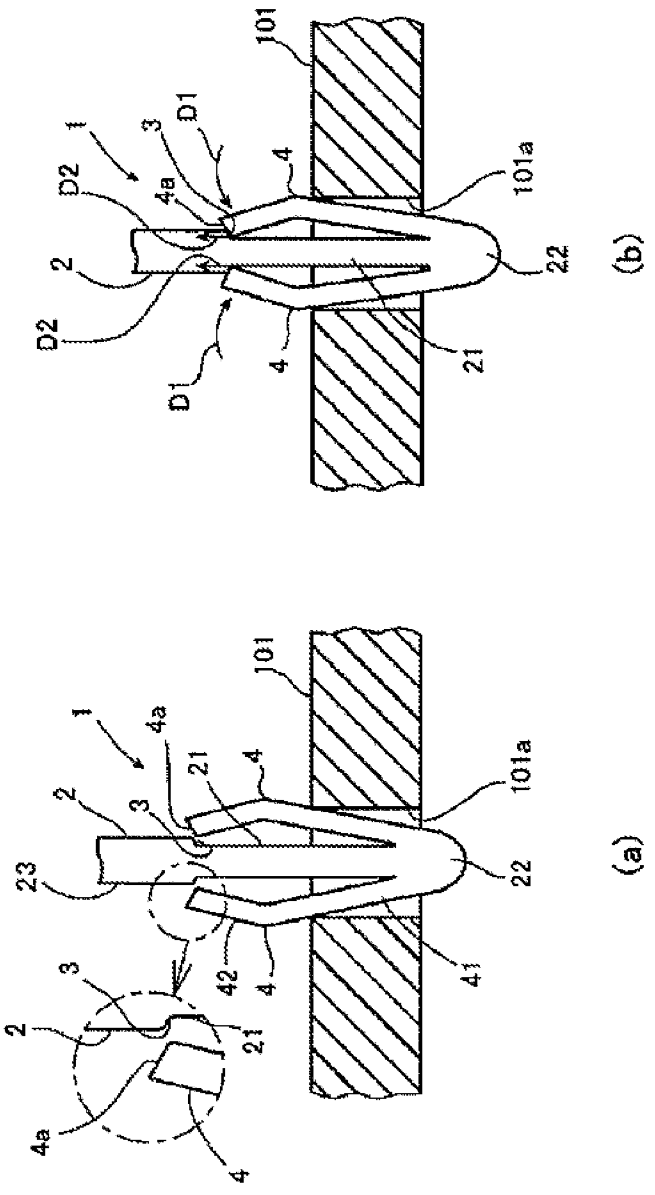
FIG. 1(*a*) is a cross-sectional view illustrating an initial state in which a press-fit terminal 1 according to Embodiment 1 is inserted into a terminal accommodation hole 101*a*, and FIG. 1(*b*) is a cross-sectional view illustrating an intermediate state.

FIG. 1(*a*) is a cross-sectional view illustrating an initial state where a press-fit terminal 1 according to Embodiment 1 is inserted into a terminal accommodation hole 101*a*, and FIG. 1(*b*) is a cross-sectional view illustrating an intermediate state.

The press-fit terminal 1 can be electrically connected to a substrate 101 without requiring soldering. The press-fit terminal 1 is conductive, and is electrically connected to a contact portion provided on an inner peripheral surface of the terminal accommodation hole 101*a* formed in a circular shape in a substrate 101. In the present embodiment, the terminal accommodation hole 101*a* is a through hole, but the terminal accommodation hole is not limited to a through hole, and may be a blind hole (a hole that does not penetrate).

The press-fit terminal 1 includes a main body part 2 and two pressure contact parts 4, which are integrally formed. The main body part 2 has an engagement portion 3. The pressure contact part 4 extends along the main body part 2 while being spaced apart from the main body part 2 in a cantilever manner from the tip of the main body part 2. That is, the pressure contact part 4 extends from the tip of the main body part 2 toward the base end portion along the main body part 2, and the pressure contact part 4 and the main body part 2 are not in contact with each other except for the tip portion.

The main body part 2 is a rod-shaped body having a rectangular cross section, and has a relatively narrow tip portion 21 and a relatively wide base end portion 23. A step is present at a boundary between the tip portion 21 and the base end portion 23, and functions as the engagement portion 3. Such a step exists on two surfaces facing the pressure contact part 4 among the four surfaces of the main body part 2.

The width of the tip portion 21 is not particularly limited, but may be, for example, 0.05 mm to 3.0 mm, preferably 0.1 mm to 2.0 mm, and more preferably 0.3 mm to 0.8 mm. Here, the width of the tip portion 21 refers to a width in a direction parallel to the sheet surface and perpendicular to the axis of the main body part 2 in FIG. 1.

The width of the base end portion 23 is not particularly limited, but may be, for example, 0.1 mm to 5.0 mm, preferably 0.3 mm to 3.0 mm, and more preferably 0.5 mm to 1.0 mm. Here, the width of the base end portion 23 refers to a width in a direction parallel to the sheet surface and perpendicular to the axis of the main body part 2 in FIG. 1.

The thickness of the main body part 2 is not particularly limited, but may be, for example, 0.1 mm to 5.0 mm, preferably 0.3 mm to 3.0 mm, and more preferably 0.5 mm to 1.0 mm. Here, the thickness of the main body part 2 refers to a thickness in a direction perpendicular to the sheet surface in FIG. 1.

The shape of the engagement portion 3 is not particularly limited as long as the engagement portion 3 can be engaged with a free end portion 4*a* of the pressure contact part 4. In the present embodiment, the engagement portion 3 has a stepped shape with the tip portion 21 as a lower stage and the base end portion 23 as an upper stage. That is, in the engagement portion 3, the width of the main body part 2 is tapered from the base end portion toward the tip portion. The wall surface of the step is not particularly limited, and may be preferably 45° to 80°, and more preferably 50° to 70° with respect to the axis of the main body part 2. Here, the wall surface of the step refers to a surface connecting the upper stage and the lower stage of the step.

The height of the step is not particularly limited, but may be 0.01 mm to 1.0 mm, preferably 0.05 mm to 0.5 mm. The height of such a step may be ½ of the difference in width between the tip portion 21 and the base end portion 23.

The main body part 2 is formed of a conductive material, typically a metal material. The metal material is not particularly limited, and may be, for example, phosphor bronze, brass, Corson copper, or the like, and preferably phosphor bronze.

The pressure contact part 4 is a plastically deformable part that extends along the main body part 2 in a cantilever manner from the tip 22 of the main body part 2 while being spaced apart from the main body part 2. The pressure contact part 4 includes a first pressure contact portion 41 that extends obliquely outward so as to be away from the tip portion 21 from the tip 22 toward the base end portion 23 of the main body part 2, and a second pressure contact portion 42 that is located closer to the base end portion 23 side than the first pressure contact portion 41 and extends obliquely inward toward the base end portion 23 so as to approach the tip portion 21. That is, the pressure contact part 4 has a shape bent at a boundary between the first pressure contact portion 41 and the second pressure contact portion 42. In a state where no external force is applied, the free end portion 4*a* of the pressure contact part 4 is separated from the engagement portion 3. The free end portion 4*a* of the pressure contact part 4 to be engaged with the engagement portion 3 has a shape corresponding to the shape of the engagement portion 3. In a preferred aspect, when the pressure contact part 4 is engaged with the engagement portion 3, substantially no gap is generated between the free end portion 4*a* and the engagement portion 3.

In the pressure contact part 4, that is, the boundary between the first pressure contact portion 41 and the second pressure contact portion 42, that is, the bent portion, is located on the base end portion 23 side. In other words, the first pressure contact portion 41 is longer than the second pressure contact portion 42. Here, the length of the first pressure contact portion 41 is a length from the tip 21 to the bent portion, and the length of the second pressure contact portion 42 is a length from the free end portion 4*a* to the bent portion. By making the length of the first pressure contact portion 41 longer than the length of the second pressure contact portion 42, an increase in the pressure contact force at the time of insertion can be made gentler, and damage to the terminal accommodation hole 101*a* can be further prevented or suppressed.

In the pressure contact part 4, the ratio of the length of the first pressure contact portion 41 to the length of the second pressure contact portion 42 (first pressure contact portion: second pressure contact portion) can be preferably 1:1 to 10:1, more preferably 2:1 to 5:1, and still more preferably 2:1 to 3:1.

The two pressure contact parts 4 are provided so as to face each other with the main body part 2 interposed therebetween, and the free end portions 4*a* of the pressure contact parts 4 are provided so as to face the engagement portions 3 respectively. That is, the two pressure contact parts 4 are provided symmetrically with respect to the main body part 2. The pressure contact part 4 and the engagement portion 3 are formed such that when the tip portion 21 of the main body part 2 is inserted into the terminal accommodation hole 101*a* by a predetermined amount, the pressure contact part 4 is deformed and the free end portion 4*a* is engaged with the engagement portion 3, as illustrated in FIG. 1(*b*). That is, when the tip portion 21 of the main body part 2 is inserted into the terminal accommodation hole 101*a*, the pressure contact part 4 is deformed so as to approach the tip portion 21 as indicated by an arrow D1, and when the predetermined insertion depth is reached, the free end portion 4*a* of the pressure contact part 4 is engaged with the engagement portion 3.

As shown in FIG. 1(*a*), in the press-fit terminal 1 of the present disclosure, since the pressure contact part 4 is cantilevered and the pressure contact force is small from the start of insertion until the tip portion 21 of the main body part 2 is inserted into the terminal accommodation hole 101*a* by a predetermined amount, damage of the terminal accommodation hole 101*a* can be prevented or suppressed. In addition, as illustrated in FIG. 1(*b*), until the press-fit terminal 1 is completely inserted after a predetermined amount is inserted, the free end portion 4*a* of the pressure contact part 4 is engaged with the engagement portion 3, and the pressure contact part 4 is in a double-supported state. Therefore, a relatively large pressure contact force is obtained, and the press-fit terminal 1 and the terminal accommodation hole 101*a* are appropriately connected. Furthermore, even when the press-fit terminal 1 is completely inserted into the terminal accommodation hole 101*a*, a relatively large pressure contact force can be obtained. The shape and the spring constant (plastic coefficient) of the pressure contact part 4 are set so as to obtain the pressure contact force as described above.

Figure 2:
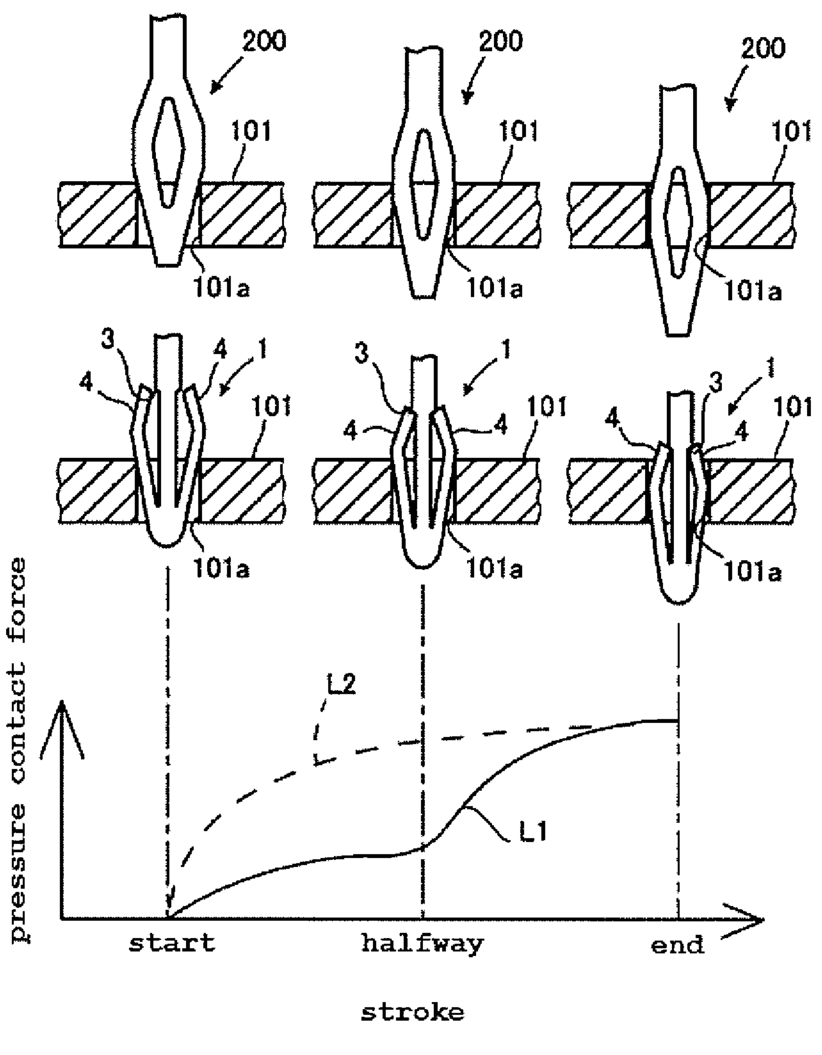
FIG. 2 shows a change in the pressure contact force when the press-fit terminal 1 in FIG. 1 and a conventional press-fit terminal 200 are inserted into the terminal accommodation hole 101*a*.

FIG. 2 shows a difference in the pressure contact force between the press-fit terminal 1 of the present disclosure and a conventional eye-needle type press-fit terminal 200. In the conventional press-fit terminal 200, a pressure contact force L2 rapidly increases from the start of insertion, reaches substantially a peak value when the press-fit terminal is inserted halfway (at the same depth as the predetermined amount), and the pressure contact force L2 remains high until the end of insertion. On the other hand, in the press-fit terminal 1 of the present disclosure, a pressure contact force L1 gradually increases at a low value from the start of insertion until the pressure contact part 4 is engaged with the engagement portion 3, and the pressure contact force L1 rapidly increases when the pressure contact part 4 is engaged with the engagement portion 3 and reaches a peak value at the end of insertion.

As described above, since the press-fit terminal 1 of the present disclosure has a small pressure contact force at the initial stage of insertion, it is possible to prevent and suppress damage to the terminal accommodation hole 101*a*. On the other hand, when the press-fit terminal 1 is inserted by a predetermined amount, the pressure contact force increases, so that it is possible to appropriately press and connect the press-fit terminal 1 to the terminal accommodation hole 101*a*.

In addition, since the tip portion 21 of the main body part 2 is supported by the pressure contact part 4 by the free end portion 4*a* of the pressure contact part 4 being engaged with the engagement portion 3, it is possible to prevent and suppress buckling of the main body part 2. That is, as shown in FIG. 1(*b*), when the main body part 2 is pressed by the terminal accommodation hole 101*a* in a state where the free end portion 4*a* of the pressure contact part 4 is engaged with the engagement portion 3, a force that pushes the engagement portion 3 toward the base end portion side acts because the free end portion 4*a* of the pressure contact part 4 attempts to move in an arrow D2, that is, a force in a tensile direction acts on the tip portion 21 of the main body part 2. Therefore, the compressive force acting on the tip portion 21 is offset, and it is possible to prevent and suppress buckling of the main body part 2.

As described above, in the press-fit terminal 1 of the present disclosure, by appropriately adjusting the width of the tip portion 21 and the shape and width of the pressure contact part 4, buckling can be prevented and suppressed while adjusting the pressure contact force at the time of insertion and the pressure contact force at the time of fixing after the insertion.

Embodiment 2

Figure 3:
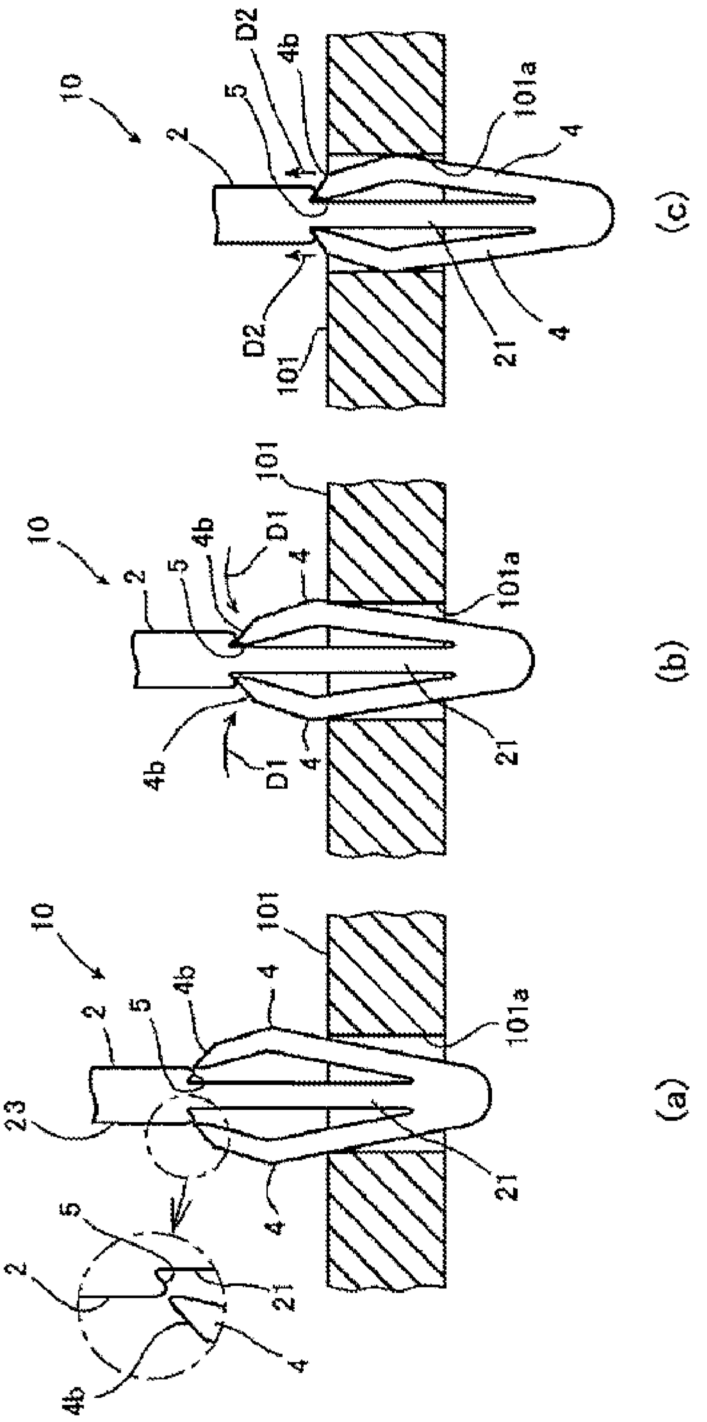
FIG. 3(*a*) is a cross-sectional view illustrating an initial state in which a press-fit terminal 10 according to Embodiment 2 is inserted into a terminal accommodation hole 101*a*, FIG. 3(*b*) is a cross-sectional view illustrating an intermediate state, and FIG. 3(*c*) is a cross-sectional view illustrating an end state.
Figure 4:
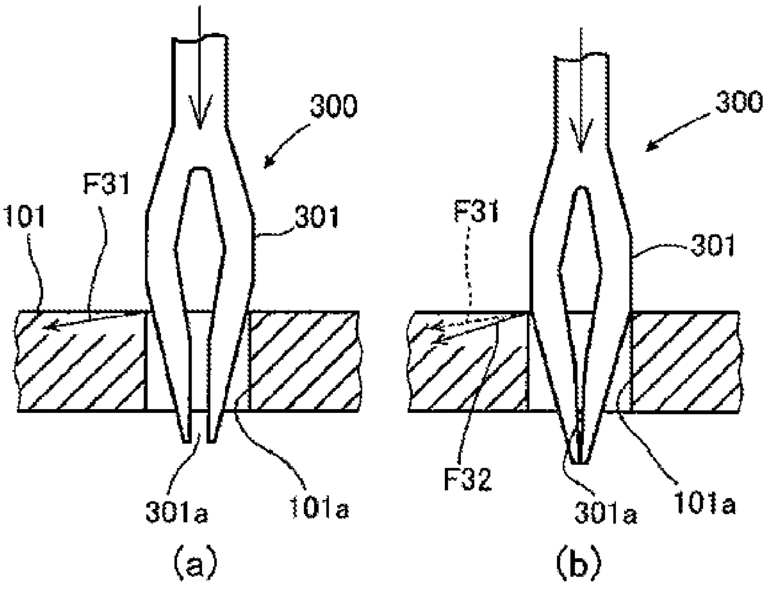
FIG. 4(*a*) is a cross-sectional view illustrating an initial state in which a conventional press-fit terminal 300 provided with a separation groove at a tip portion of a pressure contact part is inserted into a terminal accommodation hole 101*a*, and FIG. 4(*b*) is a cross-sectional view illustrating an intermediate state.
Figure 5:
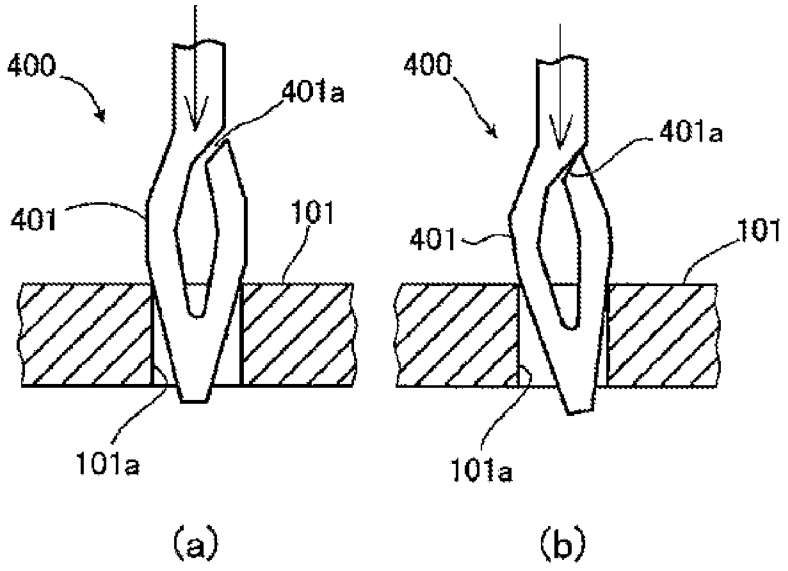
FIG. 5(*a*) is a cross-sectional view illustrating an initial state in which a conventional press-fit terminal 400 provided with a separation groove at a base end portion of a pressure contact part is inserted into a terminal accommodation hole 101*a*, and FIG. 5(*b*) is a cross-sectional view illustrating an intermediate state.
Figure 6:
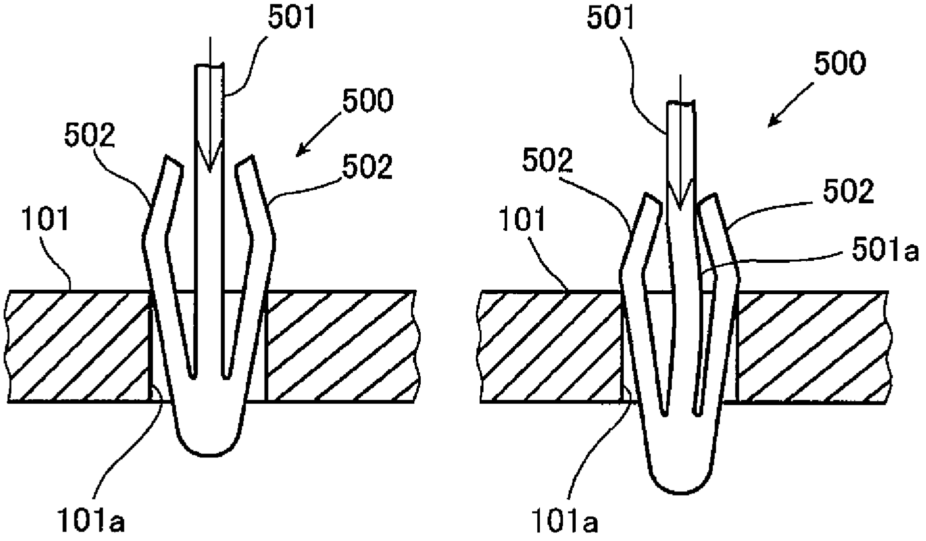
FIG. 6(*a*) is a cross-sectional view illustrating an initial state in which a conventional press-fit terminal 500 having an arrowhead shape is inserted into a terminal accommodation hole 101*a*, and FIG. 6(*b*) is a cross-sectional view illustrating an intermediate state.

FIG. 3(*a*) is a cross-sectional view illustrating an initial state in which a press-fit terminal 10 according to Embodiment 2 is inserted into the terminal accommodation hole 101*a*, FIG. 3(*b*) is a cross-sectional view illustrating an intermediate state, and FIG. 3(*c*) is a cross-sectional view illustrating an end state. In Embodiment 2, the shape of the engagement portion 5 and the shape of the free end portion 4*b* of the pressure contact part 4 are different from those in Embodiment 1. Configurations equivalent to those of Embodiment 1 are denoted by the same reference numerals, and the description thereof will be omitted.

The engagement portion 5 of the present embodiment is formed in a hook shape protruding from the base end side toward the tip side of the main body part 2. That is, as illustrated in FIG. 3(*a*), at the boundary between the tip portion 21 and the base end portion 23, the base end portion 23 protrudes outward toward the tip portion 21 side, and the thickness of the protrusion gradually decreases toward the tip thereof. In other words, a recess is formed on the wall surface of the step present at the boundary between the tip portion 21 and the base end portion 23 toward the base end portion 23 side, the recess gradually narrows toward the base end portion 23 side, and the tip of the recess preferably has an acute angle.

The free end portion 4*b* of the pressure contact part 4 is formed to have a shape corresponding to the shape of the engagement portion 5. In FIG. 3(*c*), the free end portion 4*b* and the engagement portion 5 are engaged with each other substantially without a gap.

At the initial stage when the press-fit terminal 10 as described above is inserted into the terminal accommodation hole 101*a*, as shown in FIG. 3(*a*), the pressure contact part 4 is in a cantilevered state, so that the pressure contact force is small, and damage to the terminal accommodation hole 101*a* can be prevented or suppressed. When the predetermined amount is inserted, the pressure contact part 4 is deformed in the direction of an arrow D1 in FIG. 3(*b*), the free end portion 4*b* is inserted into and engaged with the engagement portion 5, and the pressure contact part 4 is brought into a double-supported state. Therefore, a relatively large pressure contact force is obtained, and the press-fit terminal 1 and the terminal accommodation hole 101*a* are appropriately connected to each other. When the press-fit terminal 10 is further inserted, as shown in FIG. 3(*c*), the pressure contact part 4 is pressed by the terminal accommodation hole 101*a*, the free end portion 4*b* side of the pressure contact part 4 attempts to extend in an arrow D2, and the free end portion 4*b* is engaged with the engagement portion 5 substantially without a gap.

According to Embodiment 2, the engagement portion 5 is formed in a hook shape at the boundary between the tip portion 21 and the base end portion 23 of the main body part 2, and the free end portion 4*b* of the pressure contact part 4 is formed so as to be in close contact with the engagement portion 5. Therefore, the free end portion 4*b* of the pressure contact part 4 is engaged with the engagement portion 5 so as to bite into the insertion direction. Therefore, the free end portion 4*b* of the pressure contact part 4 is more firmly fixed, and it is possible to enhance torsion resistance, inclination resistance, and the like (deformation resistance and rigidity) of the press-fit terminal 10.

While the embodiments of the invention of the present disclosure have been described above, the specific configuration is not limited to the above embodiments, and a change in design or the like within the scope not departing from the gist of the invention is included in the invention.

For example, the shape of the pressure contact part 4 is not limited to that described above, and may be, for example, a shape in which a portion parallel to the main body part 2 is provided between the first pressure contact portion 41 and the second pressure contact portion 42, that is, a table shape. By forming the pressure contact part in a table shape, a contact area with the terminal accommodation hole is increased, and the connection is more reliable. Further, in the above embodiments, two pressure contact parts 4 are provided with respect to the main body part 2, but one or three or more pressure contact parts 4 may be provided according to the required pressure contact force, the size of the terminal accommodation hole 101*a*, and the like. Furthermore, a cylindrical (umbrella-shaped) pressure contact part surrounding the periphery of the tip portion 21 of the main body part 2 may be provided.

INDUSTRIAL APPLICABILITY

The press-fit terminal of the present disclosure can be suitably used for connection of various electronic components.

DESCRIPTION OF REFERENCE SIGNS

- 1, 10: Press-fit terminal
- 2: Main body part
- 3, 5: Engagement portion
- 4: Pressure contact part
- 4*a*, 4*b*: Free end portion
- 21: Tip portion
- 22: Tip
- 23: Base end portion
- 101: Substrate
- 101*a*: Terminal accommodation hole

What is claimed is:

1. A press-fit terminal comprising:

a main body part having a rod shape; and two pressure contact parts, each pressure contact part of the two pressure contact parts extending along the main body part in a cantilever manner from a tip portion of the main body part while being spaced apart from the main body part, wherein:

the main body part includes an engagement portion with which a free end portion of the pressure contact part is engageable, the engagement portion is formed such that the free end portion of the pressure contact part is engaged with the engagement portion to prevent the free end portion of the pressure contact part from sliding toward a base end portion of the main body part beyond the engagement portion at a time of inserting the press-fit terminal into a terminal accommodation hole, and the two pressure contact parts are provided symmetrically with respect to the main body part.

2. The press-fit terminal according to claim 1, wherein the pressure contact part and the engagement portion are formed such that the pressure contact part is deformed.

3. The press-fit terminal according to claim 2, wherein the pressure contact part and the engagement portion are further formed such that the free end portion is engaged with the engagement portion at a time of insertion into the terminal accommodation hole.

4. The press-fit terminal according to claim 1, wherein the tip portion of the main body part is narrower than the base end portion of the main body part.

5. The press-fit terminal according to claim 4, wherein the engagement portion is provided at a boundary between the tip portion of the main body part and the base end portion of the main body part.

6. The press-fit terminal according to claim 1, wherein a shape of the engagement portion is a shape corresponding to a shape of the free end portion of the pressure contact part.

7. The press-fit terminal according to claim 4, wherein the engagement portion is a step having the tip portion of the main body part as a lower stage and the base end portion of the main body part as an upper stage.

8. The press-fit terminal according to claim 7, wherein a wall surface of the step has an angle of 45° to 80° with respect to an axis of the main body part.

9. The press-fit terminal according to claim 8, wherein the wall surface of the step has an angle of 50° to 70° with respect to the axis of the main body part.

10. The press-fit terminal according to claim 7, wherein the main body part has a rectangular cross section.

11. The press-fit terminal according to claim 10, wherein the step exists on two surfaces facing the pressure contact part among four surfaces of the main body part.

12. The press-fit terminal according to claim 7, wherein a height of the step is from 0.01 millimeters (mm) to 1.0 mm.

13. The press-fit terminal according to claim 7, wherein a height of the step is half of a difference in width between the tip portion of the main body part and the base end portion of the main body part.

14. The press-fit terminal according to claim 1, wherein the engagement portion protrudes in a hook shape from a base end side toward a tip side of the main body part.

15. The press-fit terminal according to claim 1, formed of a conductive material.

16. The press-fit terminal according to claim 1, wherein the main body part has a rectangular cross section.

17. The press-fit terminal according to claim 1, wherein the engagement portion protrudes outwardly as a protrusion from a base end side of the main body part toward a tip side of the main body part, and wherein a thickness of the protrusion decreases gradually from the base end side of the main body part to a tip of the protrusion.

18. The press-fit terminal according to claim 1, wherein a width of the tip portion of the main body part, or a width of the base end portion of the main body part, is from 0.1 mm to 5.0 mm.

* * * * *